United States Patent
Zernhelt

(10) Patent No.: US 10,813,489 B2
(45) Date of Patent: Oct. 27, 2020

(54) COFFEE MAKER HAVING WATER TANK HEATER CONTROL

(71) Applicant: Helen of Troy Limited, Belleville, St. Michael (BB)

(72) Inventor: Justin Michael Zernhelt, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 365 days.

(21) Appl. No.: 15/810,259

(22) Filed: Nov. 13, 2017

(65) Prior Publication Data

US 2019/0142213 A1    May 16, 2019

(51) Int. Cl.
A47J 31/56    (2006.01)
A47J 31/057    (2006.01)

(52) U.S. Cl.
CPC .......... *A47J 31/56* (2013.01); *A47J 31/0573* (2013.01)

(58) Field of Classification Search
CPC   A47J 31/24; A47J 31/465; A47J 31/52; A47J 31/525; A47J 31/545; A47J 31/4403; A47J 31/4478; A47J 31/057; A47J 31/5253; A47J 31/56; A47J 31/0573; C01B 3/042; H05B 1/02; F24H 1/10
USPC ......... 99/280, 281, 284, 286, 287, 288, 290, 99/295, 297–300, 304, 305, 306, 316, 99/495; 219/494, 497, 492, 438, 439, 219/452, 506–511
See application file for complete search history.

(56) References Cited

U.S. PATENT DOCUMENTS

| | | | |
|---|---|---|---|
| 5,115,730 A | 5/1992 | Gockelmann | |
| 5,836,236 A | 11/1998 | Rolfes et al. | |
| 5,865,097 A * | 2/1999 | Smit | A47J 31/56 222/146.5 |
| 7,322,275 B2 | 1/2008 | Lussi | |
| 7,631,593 B2 * | 12/2009 | Lassota | A47J 31/002 99/280 |
| 8,829,398 B2 * | 9/2014 | De Haan | A47J 31/545 219/494 |
| 2017/0135514 A1 * | 5/2017 | Caputa | A47J 31/4492 |

FOREIGN PATENT DOCUMENTS

NL    8401201    11/1985

* cited by examiner

*Primary Examiner* — Sarang Afzali
(74) *Attorney, Agent, or Firm* — Rankin, Hill & Clark LLP

(57) ABSTRACT

A coffee maker includes a water tank, a heater, a brew basket, a fluid path between the water tank and the brew basket, a boiler, and a controller in electrical communication with the heater and the boiler. The heater is ON when the volume of water to be brewed into coffee is greater than a first predetermined threshold. The heater heats the water in the water tank to a first water temperature when the volume of water to be brewed into coffee is greater than the first predetermined threshold and less than a second predetermined threshold, which is greater than the first predetermined threshold. The heater heats the water in the water tank to a second water temperature, which is higher than the first water temperature, when the volume of water to be brewed into coffee is greater than the second predetermined threshold.

15 Claims, 2 Drawing Sheets

COFFEE MAKER HAVING WATER TANK HEATER CONTROL

BACKGROUND

Known drip coffee makers include a water tank, a boiler, a brew basket, and a carafe. The water tank connects with the brew basket via a fluid line. The boiler is positioned along the fluid line and heats water from the water tank and pushes the heated water toward the brew basket.

It is desirable to deliver water to the filter basket within a certain amount of time from when the first drop of water is deposited onto dry coffee grounds within the brew basket until the last drop of water is delivered. When a relatively large volume of water is to be brewed into coffee, known drip coffee maker can take too long from when the first drop of water is deposited onto the dry coffee grounds until the last drop of water is delivered.

NL 8401201 describes a coffee maker having a heating unit in the water tank in addition to a through-flow heating unit positioned along the fluid line between the water tank and a hot water outlet, which would lead to a brew basket. When a particular volume of water, or water level, is in the water tank, water in the water tank is heated to a particular temperature, which is disclosed as 70° C. A control unit controls power to the through-flow heating unit based on the water level in the water tank. NL 8401201 describes a complicated through-flow heating unit design and delivering more power to the heating unit in the water tank than may be necessary, especially when a smaller volume of water is to be brewed into coffee.

SUMMARY

In view of the foregoing, a coffee maker includes a water tank for holding water, a heater in thermal communication with the water tank, a brew basket downstream from the water tank, a fluid path between the water tank and the brew basket, a boiler along the fluid path between the water tank and the brew basket, and a controller in electrical communication with the heater and the boiler. The controller is configured to control delivery of electrical power to the heater. The controller controls the heater such that the heater is ON when the volume of water to be brewed into coffee is greater than a first predetermined threshold. The controller controls the heater such that the heater heats the water in the water tank to a first water temperature when the volume of water to be brewed into coffee is greater than the first predetermined threshold and less than a second predetermined threshold, which is greater than the first predetermined threshold. The controller controls the heater such that the heater heats the water in the water tank to a second water temperature, which is higher than the first water temperature, when the volume of water to be brewed into coffee is greater than the second predetermined threshold.

The controller can be further configured to control delivery of electrical power to the heater such that when the volume of water to be brewed into coffee is greater than the first predetermined threshold and less than the second predetermined threshold and after the water in the tank measures the first water temperature, the heater is OFF. The controller can also be further configured to control the heater such that when the volume of water to be brewed into coffee is greater than the second predetermined threshold and after the water tank measures the second water temperature, the heater is OFF.

The controller can further be configured to control delivery of electrical power to the boiler. The controller can control the boiler such that when the volume of water to be brewed into coffee is greater than the first predetermined threshold and less than the second predetermined threshold and after the water in the water tank measures the first water temperature, the boiler is ON for a first BOILER ON time duration. The controller can be configured to control the boiler such that when the volume of water to be brewed into coffee is greater than the second predetermined threshold and after the water in the water tank measures the second water temperature, the boiler is ON for a second BOILER ON time duration, which is greater than the first BOILER ON time duration.

A method of operating a coffee maker includes determining a volume of water that is to be brewed into coffee via a controller of the coffee maker. The method further includes heating water in a water tank of the coffee maker to a first water temperature when the determined volume of water that is to be brewed into coffee is greater than a first predetermined threshold and less than a second predetermined threshold. The method further includes heating water in the water tank to a second water temperature, which is higher than the first water temperature, when the determined volume of water that is to be brewed into coffee is greater than the second predetermined threshold. The method further includes turning ON a boiler of the coffee maker, which is in fluid communication with the water tank, after one of the following conditions is met: (1) the determined volume of water that is to be brewed into coffee is greater than the first predetermined threshold and less than the second predetermined threshold and the first water temperature has been achieved; (2) the determined volume of water that is to be brewed into coffee is greater than the second predetermined threshold and the second water temperature has been achieved; and, (3) the determined volume of water that is to be brewed into coffee is less than the first predetermined threshold.

DETAILED DESCRIPTION

Figure 1:
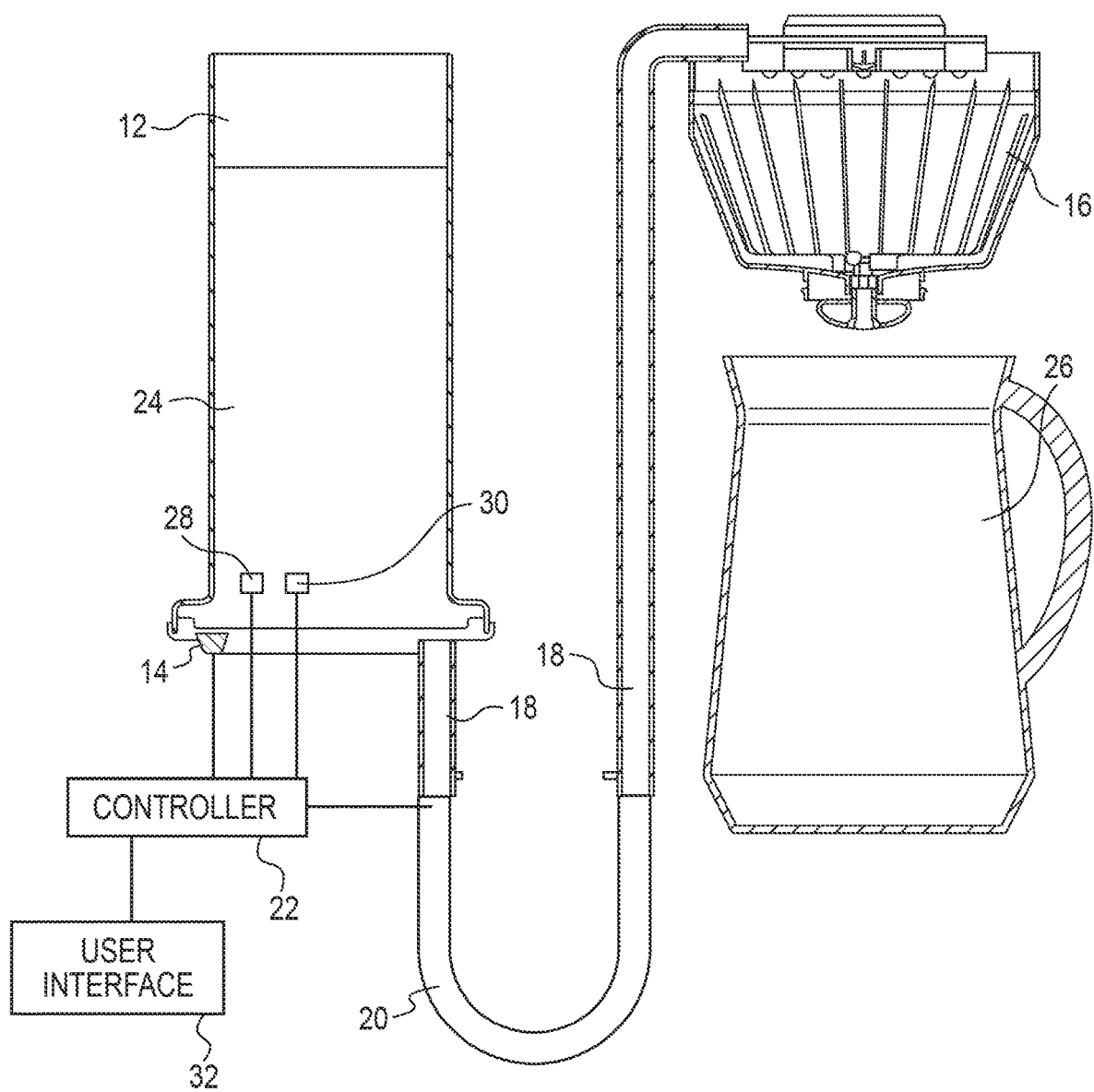
FIG. 1 is a schematic depiction of a coffee maker having a water tank heater control.

FIG. 1 shows a coffee maker 10 including a water tank 12, a heater 14, a brew basket 16, a fluid path 18, a boiler 20, and a controller 22. The water tank 12 is for holding water 24 that is to be brewed into coffee. The heater 14 is in thermal communication with the water tank 12. The brew basket 16 is downstream from the water tank 12 and is designed to hold a filter and coffee grounds in a conventional manner. The fluid path 18 is positioned between the water tank 12 and the brew basket 16 to allow for the water 24, which has been heated by the heater 14 (if necessary) and the boiler 20 to be delivered to the brew basket 16. The boiler 20 is positioned along the fluid path 18 between the water tank 12 and the brew basket 16. The boiler 20 also pushes the water toward the brew basket 16. The fluid path 18 can be in the form of pipes connecting the water tank 12 to the brew basket 16. The controller 22 is in electrical communication with the heater 14 and the boiler 20. The coffee maker 10 can also include a carafe 26 that receives the brewed coffee from the brew basket 16. The coffee maker 10 also includes a thermometer 28, or similar temperature sensor, for detecting the temperature of the water 24 in the water tank 12. The thermometer 28 is in electrical communication with the controller 22. The coffee maker 10 also includes a water sensor 30 that is in electrical communication with the controller 22. The water sensor 30 detects the volume or level of water 24 within the water tank 12. The coffee maker 10 also includes a user interface 32, which can include buttons, touch pads, knobs, or the like, to allow a user of the coffee maker 10 to input commands for processing by the controller 22. The user interface 32 is also in electrical communication with the controller 22. The coffee maker 10 connects with and receives power from an electrical power source (not shown). The coffee maker 10 is schematically depicted in FIG. 1, and the components thereof can take may take different configurations.

The coffee maker 10 can be configured to brew about 12 "cups" of coffee where each "cup" is about 5 U.S. fluid ounces or about 150 ml of brewed coffee. The controller 22 is in electrical communication with the heater 14 and the boiler 20 to control delivery of electrical power to the heater 14 or the boiler 20 depending on the volume of water to be brewed into coffee, which can be selected by the user, via the user interface 32. Alternatively, the water sensor 30 (or other sensor, e.g., a weight sensor, which is not shown) can detect the volume of water 24 in the water tank 12 and the controller 22 can determine the volume of water to be brewed into coffee based on the volume of water 24 in the water tank 12.

Figure 2:
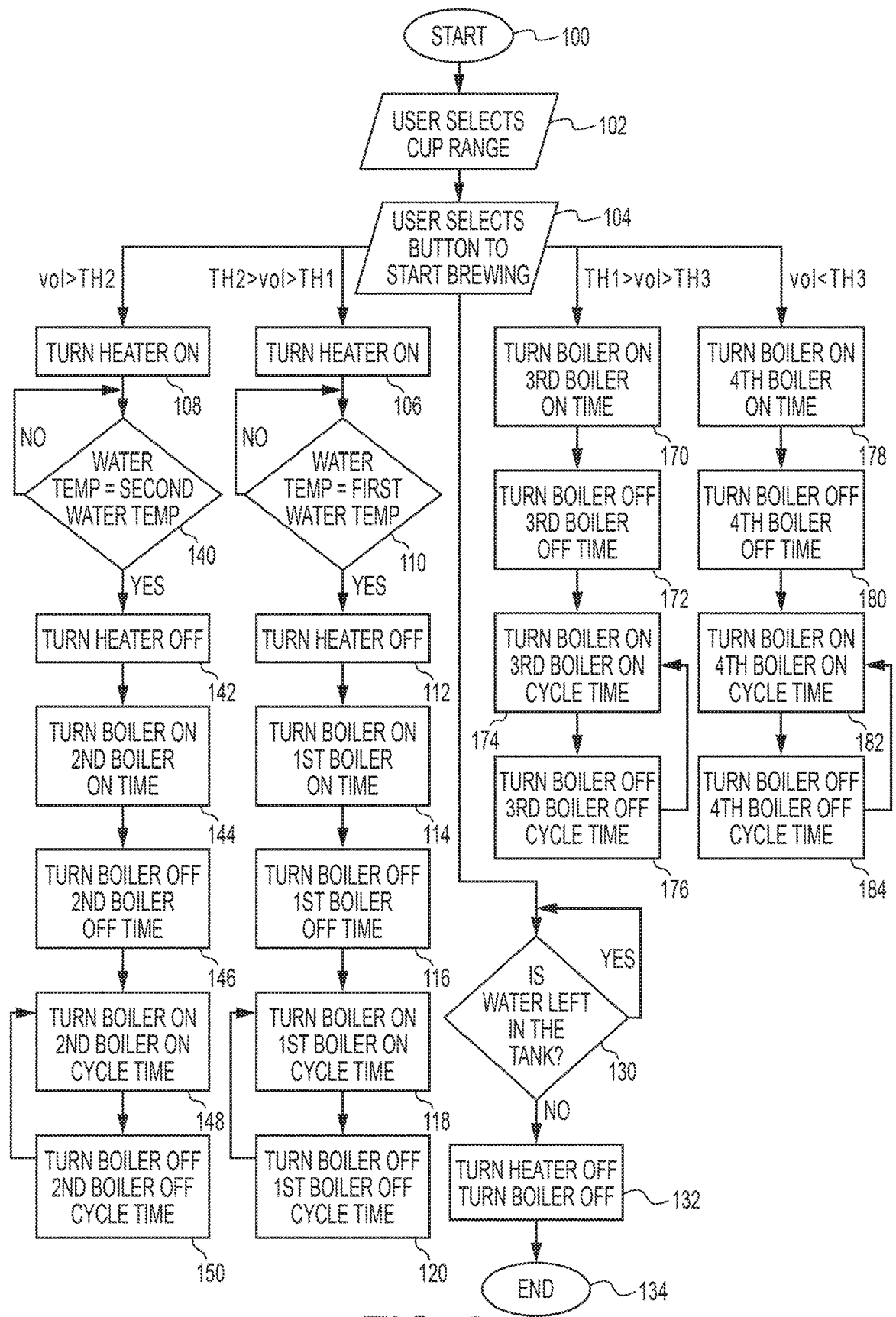
FIG. 2 is a flow diagram depicting a method of operating the coffee maker depicted in FIG. 1.

With reference to FIG. 2, a method of operating the coffee maker 10 starts at 100 and the user can select the number of cups of coffee to be brewed at 102 and then press a button or perform another operation on the user interface 32 to begin the brewing process at 104. The heater 14 (FIG. 1) is turned ON when the volume of water to be brewed into coffee is greater than a first predetermined threshold TH1, e.g., about 7 cups of coffee, as seen at step 106 and step 108 in FIG. 2. In contrast, the heater is OFF when the volume of water to be brewed into coffee is less than the first predetermined threshold TH1. Dependent upon the volume of water to be brewed into coffee, the controller 22 controls the heater such that the water 24 (FIG. 1) in the water tank 12 (FIG. 1) is heated to a first water temperature when the volume of water to be brewed into coffee is greater than the first predetermined threshold TH1 and less than a second predetermined threshold TH2, e.g., about 9 cups of coffee. At 110, the controller 22 determines whether the water temperature of the water 24 in the water tank 12 is equal to or greater than a first water temperature, e.g., about 50° C. If the water temperature of the water 24 in the water tank 12 is less than the first water temperature, then the heater 14 remains ON. Alternatively, the heater 14 can cycle ON and OFF between step 106 and step 110 until the water temperature reaches the first water temperature. When the water temperature of the water 24 in the water tank 12 is equal to or greater than the first water temperature, then the heater turns OFF at 112, and the boiler 20 turns ON at 114. The boiler 20 is turned ON for a first BOILER ON time duration and then is turned OFF at 116. The first BOILER ON time duration can be about 50 seconds. The boiler 20 remains OFF for a first BOILER OFF time duration, which can be about 30 seconds, and then the boiler 20 is turned ON again at 118. The boiler 20 can remain ON for a first BOILER ON CYCLE time duration, which is about 80 seconds, and then turn OFF at 120. The boiler 20 can then remain OFF for a first BOILER OFF CYCLE time duration, which can be about 30 seconds, and then return to step 118 where the boiler 20 is turned back ON.

During the brewing process, the water sensor 30 senses whether water 24 remains in the water tank 12 and makes a determination at 130 whether water 24 is left in the water tank 12. If there is water 24 left in the water tank 12, then the controller 22 returns to determine whether water 24 remains in the water tank 12. When the controller 22 determines that no water remains in the water tank 12, the heater 14 and the boiler 20 are turned OFF at 132 and the process ends at 134.

As mentioned above, the heater 14 is ON when the volume of water to be brewed into coffee greater than the first predetermined threshold TH1. With reference to step 108, the heater 14 remains ON until the water 24 in the water tank 12 measures a second water temperature, which is higher than the first water temperature, when the volume of water to be brewed into coffee is greater than the second predetermined threshold TH2. Alternatively, the heater 14 can cycle ON and OFF between step 108 and step 140 until the water temperature reaches the second water temperature. As mentioned above, the first water temperature is about 50° C. The second water temperature can be about 70° C. Since more water 24 is to be heated, the second water temperature for the water 24 is nearer to boiling, so that the boiler 20 can deliver the water 24 from the water tank 12 to the brew basket 16 more quickly. As such, when a user selects between about 10 to 12 cups of coffee to be brewed, the controller 22 can determine whether the water temperature of the water 24 in the water tank 12 has reached the second water temperature at 140. If the water 24 in the water tank 12 is less than the second water temperature, then the heater 14 remains ON, or cycles ON and OFF, until the water 24 in the water tank 12 reaches the second water temperature. When the water temperature of the water 24 in the water tank 12 is equal to or greater than the second water temperature, then the controller 22 turns the heater 14 OFF at 142. The controller 22 then turns the boiler 20 ON at 144 and the boiler remains ON for a second BOILER ON time duration, which can be about 90 seconds. Accordingly, the second BOILER ON time is greater than the first BOILER ON time duration. The controller 22 then turns the boiler OFF at 146 and the boiler remains OFF for a second BOILER OFF time duration, which can be about 30 seconds. The controller 22 then turns the boiler 20 back ON at 148 after the second BOILER OFF time duration has elapsed. The boiler 20 remains ON for a second BOILER ON CYCLE time duration, which can be about 86 seconds, which is greater than the first BOILER ON CYCLE time duration. The boiler 20 is then turned OFF at 150 for a second BOILER OFF CYCLE time duration, which can be about 30 seconds and then returns to step 148 where the controller 22 turns the boiler 20 back ON.

With reference back to step 104, where the user selects the volume of water to be brewed into coffee that is less than the first predetermined threshold TH1, then the heater 14 is not turned ON, but instead only the boiler 20 is turned ON at steps 170 and 172. When the volume of water to be brewed into coffee is greater than a third predetermined threshold TH3, e.g., about 4 cups of coffee, and less than the first predetermined threshold, the boiler is ON for a third BOILER ON time duration, which can be about 45 seconds. For example, when the user selects to brew between 5 and 6 cups of coffee, it is greater than the third predetermined threshold TH3, but less than the first predetermined threshold TH1. The boiler 20 is turned ON at 170 for the third BOILER ON time and then is turned OFF at 172 for a third BOILER OFF time duration, which can be about 30 seconds. The boiler 20 is then turned back ON at 174 after the third BOILER OFF time duration has elapsed. The boiler 20 remains ON for a third BOILER ON CYCLE time duration, which can be about 45 seconds, and then turns OFF at 176. The boiler 20 is turned OFF at 176 for a third BOILER OFF CYCLE time duration and then returns to step 174 where the boiler 20 is turned back ON.

When the volume of water to be brewed into coffee is less than the third predetermined threshold TH3, the boiler 20 is ON at 172 for a fourth BOILER ON time duration, which is less than the third BOILER ON time duration. The boiler 20 remains ON and then is turned OFF, at 180, after the fourth BOILER ON time duration has elapsed. The boiler 20 remains OFF for a fourth BOILER OFF time duration, which can be about 30 seconds, and then is turned back ON at 182. The boiler 20 remains ON at 182 for a fourth BOILER ON CYCLE time duration and then is turned OFF at 184. The boiler 20 remains OFF at 184 for a fourth BOILER OFF CYCLE time duration and then returns to 182 where the boiler is turned back ON.

As described above, a method of operating the coffee maker 10 can include determining the volume of water that is to be brewed into coffee via the controller 22 of the coffee maker 10. For example, the user can select, at 104, the volume of water that is to be brewed into coffee using the user interface 32, which is in electrical communication with the controller 22. The water 24 is then heated in the water tank 12 to the first water temperature, e.g., 50° C., when the determined volume of water that is to be brewed into coffee is greater than the first predetermined threshold TH1 and less than the second predetermined threshold TH2. The water 24 in the water tank 12 is heated to the second water temperature, e.g., 70° C., when the determined volume of water that is to be brewed into coffee is greater than the second predetermined threshold TH2, for example when 10 to 12 cups have been selected. The boiler 20 on the coffee maker is turned ON after one of the following conditions is met: (1) the determined volume of water that is to be brewed into coffee is greater than the first predetermined threshold TH1 and less than the second predetermined threshold TH2 and the first water temperature has been achieved in the water tank 12; (2) the determined volume of water to be brewed into coffee is greater than the second predetermined threshold TH2 and the second water temperature has been achieved in the water tank 12; and (3) the determined volume of water that is to be brewed into coffee is less than the first predetermined threshold TH1.

The method of operating the coffee maker 10 can further include turning the boiler 20 ON for the first BOILER ON time duration when the determined volume of water to be brewed into coffee is greater than the first predetermined threshold TH1 and less than the second predetermined threshold TH2 after the water in the water tank measures the first water temperature. When the determined volume of water to be brewed into coffee is greater than the second predetermined threshold TH2 and after the water in the water tank measures the second water temperature, the boiler 20 can turn ON for a second BOILER ON time duration, which is greater than the first BOILER ON time duration. When the determined volume of water to be brewed into coffee is less than the first predetermined threshold TH1 and greater than the third predetermined threshold TH3, the boiler 20 can turn ON for the third BOILER ON CYCLE time duration. When the determined volume of water to be brewed into coffee is less than the third predetermined threshold TH3, the boiler 20 can turn ON for the fourth BOILER ON CYCLE time duration, which is shorter than the third BOILER ON CYCLE time duration. The boiler 20 can turn OFF after each of the BOILER ON time duration has elapsed.

The coffee maker and a method of operating the coffee maker has been described above with particularity. Modifications to the coffee maker, such as using a different water tank, brew basket, or carafe, performing certain steps in an order different than that described, or varying the thresholds may occur to those upon reading and understanding the preceding detailed description. Even though the flowchart depicted in FIG. 2 presents steps in a logical order, the claims should not be limited as such unless there is specific reference otherwise. The invention is not limited only to the embodiments described above. Instead, the invention is broadly defined by the appended claims and the equivalents thereof.

It will also be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A coffee maker comprising:
   a water tank for holding water;
   a heater in thermal communication with the water tank;
   a brew basket downstream from the water tank;
   a fluid path between the water tank and the brew basket;
   a boiler along the fluid path between the water tank and the brew basket; and
   a controller in electrical communication with the heater and the boiler, the controller being configured to control delivery of electrical power to the heater such that
      the heater is ON when the volume of water to be brewed into coffee is greater than a first predetermined threshold,
      the heater heats the water in the water tank to a first water temperature when the volume of water to be brewed into coffee is greater than the first predetermined threshold and less than a second predetermined threshold, which is greater than the first predetermined threshold, and the heater heats the water in the water tank to a second water temperature, which is higher than the first water temperature, when the volume of water to be brewed into coffee is greater than the second predetermined threshold,
   wherein the controller is further configured to control delivery of electrical power to the boiler such that
      when the volume of water to be brewed into coffee is greater than the first predetermined threshold and less than the second predetermined threshold and after the water is the water tank measures the first water temperature, the boiler is ON for a first BOILER ON time duration,
      when the volume of water to be brewed into coffee is greater than the second predetermined threshold and after the water in the water tank measures the second water temperature, the boiler is ON for a second BOILER ON time duration, which is greater than the first BOILER ON time duration, and
      the boiler turns OFF after each of the first BOILER ON time duration and the second BOILER ON time duration has elapsed.

2. The coffee maker of claim 1, wherein controller is further configured to control delivery of electrical power to the boiler such that
the boiler cycles between ON and OFF such that the boiler turns OFF after each of the first BOILER ON time duration and the second BOILER ON time duration has elapsed,
wherein the boiler is ON for a first BOILER ON CYCLE time duration when the volume of water to be brewed into coffee is greater than the first predetermined threshold and less than the second predetermined threshold, and
wherein the boiler is ON for a second BOILER ON CYCLE time duration, which is longer than the first BOILER ON CYCLE time duration, when the volume of water to be brewed into coffee is greater than the second predetermined threshold.

3. The coffee maker of claim 2, wherein controller is further configured to control delivery of electrical power to the boiler such that
wherein the boiler is OFF for a first BOILER OFF CYCLE time duration after the first BOILER ON CYCLE time duration has elapsed, and
wherein the boiler is OFF for a second BOILER OFF CYCLE time duration after the second BOILER ON CYCLE time duration has elapsed.

4. The coffee maker of claim 3, wherein the first BOILER ON time duration, the second BOILER ON time duration, the first BOILER OFF CYCLE time duration and the second BOILER OFF CYCLE time duration are all equal.

5. The coffee maker of claim 2, wherein the controller is configured to control delivery of electrical power to the boiler such that
when the volume of water to be brewed into coffee is greater than a third predetermined threshold and less than the first predetermined threshold, the boiler is ON for a third BOILER ON time duration, and
when the volume of water to be brewed into coffee is less than the third predetermined threshold, the boiler is ON for a fourth BOILER ON time duration, which is less than the third BOILER ON time duration.

6. The coffee maker of claim 5, wherein the controller is configured to control delivery of electrical power to the boiler such that
the boiler cycles between ON and OFF such that the boiler turns OFF after each of the third BOILER ON time duration and the fourth BOILER ON time duration has elapsed,
wherein the boiler is ON for a third BOILER ON CYCLE time duration when the volume of water to be brewed into coffee is less than the first predetermined threshold and greater than the third predetermined threshold, and
wherein the boiler is ON for a fourth BOILER ON CYCLE time duration, which is shorter than the third BOILER ON CYCLE time duration, when the volume of water to be brewed into coffee is less than the third predetermined threshold.

7. The coffee maker of claim 1, wherein the controller is further configured to control delivery of electrical power to the heater such that
when the volume of water to be brewed into coffee is greater than the first predetermined threshold and less than the second predetermined threshold and after the water in the water tank measures the first water temperature, the heater is OFF, and
when the volume of water to be brewed into coffee is greater than the second predetermined threshold and after the water in the water tank measures the second water temperature, the heater is OFF.

8. The coffee maker of claim 1, wherein the controller is further configured to control delivery of electrical power to the heater such that
when the volume of water to be brewed into coffee is greater than the first predetermined threshold and less than the second predetermined threshold and after the water in the water tank measures the first water temperature, the heater is OFF, and
when the volume of water to be brewed into coffee is greater than the second predetermined threshold and after the water in the water tank measures the second water temperature, the heater is OFF.

9. The coffee maker of claim 1, wherein the controller is further configured such that the heater is OFF when the volume of water to be brewed into coffee is less than or equal to the first predetermined threshold.

10. The coffee maker of claim 1, further comprising a user interface in electrical communication with the controller, the user interface being configured to receive input from a user which allows the user to select the volume of water to be brewed into coffee.

11. The coffee maker of claim 1, further comprising a water sensor associated with the water tank which monitors the volume of water remaining in the water tank.

12. A coffee maker comprising:
a water tank for holding water;
a heater in thermal communication with the water tank;
a brew basket downstream from the water tank;
a fluid path between the water tank and the brew basket;
a boiler along the fluid path between the water tank and the brew basket; and
a controller in electrical communication with the heater and the boiler, the controller being configured to control delivery of electrical power to the boiler depending on a volume of water to be brewed into coffee such that
the boiler is ON for a first BOILER ON time duration for a first volume of water to be brewed into coffee after the first volume of water in the water tank is heated by the heater to a first water temperature,
the boiler is ON for a second BOILER ON time duration for a second volume of water to be brewed into coffee after the second volume of water in the water is heated by the heater to a second water temperature, and
the boiler turns OFF after each of the first BOILER ON time duration and the second BOILER ON time duration has elapsed.

13. The coffee maker of claim 12, further comprising:
a user interface in electrical communication with the controller, the user interface being configured to receive input from a user which allows the user to select the volume of water to be brewed into coffee; and
a water sensor associated with the water tank which detects the volume of water in the water tank, and the controller being configured to determine the volume of water to be brewed into coffee based on the detected volume of water in the water tank.

14. A method of operating a coffee maker comprising:
determining a volume of water that is to be brewed into coffee via a controller of the coffee maker;
heating water in a water tank of the coffee maker to a first water temperature when the determined volume of water that is to be brewed into coffee is greater than a first predetermined threshold and less than a second predetermined threshold;

heating water in the water tank to a second water temperature, which is higher than the first water temperature, when the determined volume of water that is to be brewed into coffee is greater than the second predetermined threshold;

turning ON a boiler of the coffee maker, which is in fluid communication with the water tank, after one of the following conditions is met:
(1) the determined volume of water that is to be brewed into coffee is greater than the first predetermined threshold and less than the second predetermined threshold and the first water temperature has been achieved,
(2) the determined volume of water that is to be brewed into coffee is greater than the second predetermined threshold and the second water temperature has been achieved; and
(3) the determined volume of water that is to be brewed into coffee is less than the first predetermined threshold;

turning the boiler ON for a first BOILER ON time duration when the determined volume of water to be brewed into coffee is greater than the first predetermined threshold and less than the second predetermined threshold after the water in the water tank measures the first water temperature;

turning the boiler ON for a second BOILER ON time duration, which is greater than the first BOILER ON time duration, when the determined volume of water to be brewed into coffee is greater than the second predetermined threshold after the water in the water tank measures the second water temperature; and turning the boiler OFF after each of the BOILER ON time duration and the second BOILER ON time duration has elapsed.

15. The method of claim 14, further comprising:

turning the boiler ON for a third BOILER ON CYCLE time duration when the determined volume of water to be brewed into coffee is less than the first predetermined threshold and greater than a third predetermined threshold, and turning the boiler ON for a fourth BOILER ON CYCLE time duration, which is shorter than the third BOILER ON CYCLE time duration, when the determined volume of water to be brewed into coffee is less than the third predetermined threshold.

* * * * *